(12) United States Patent
Watanabe (10) Patent No.: US 11,150,395 B2
(45) Date of Patent: Oct. 19, 2021

(54) LIGHT GUIDE AND LIGHT EMITTING DEVICE

(71) Applicant: Koichi Watanabe, Tokyo (JP)

(72) Inventor: Koichi Watanabe, Kawasaki (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/801,402

(22) Filed: Feb. 26, 2020

(65) Prior Publication Data
US 2020/0319390 A1 Oct. 8, 2020

(30) Foreign Application Priority Data

Mar. 8, 2019 (JP) .............................. JP2019-042887
Feb. 13, 2020 (JP) .............................. JP2020-021972

(51) Int. Cl.
*F21V 8/00* (2006.01)

(52) U.S. Cl.
CPC ......... *G02B 6/0018* (2013.01); *G02B 6/0036* (2013.01); *G02B 6/0051* (2013.01)

(58) Field of Classification Search
None
See application file for complete search history.

(56) References Cited

U.S. PATENT DOCUMENTS

| 4,215,647 | A * | 8/1980 | Fukasawa | G01D 13/22 116/286 |
| 5,934,782 | A * | 8/1999 | Atkins | G01D 11/28 362/23.2 |
| 7,500,774 | B2 | 3/2009 | Nishiyama et al. | |
| 2006/0193147 | A1* | 8/2006 | Inoue | G02B 6/0021 362/602 |
| 2007/0159846 | A1* | 7/2007 | Nishiyama | G01D 11/28 362/602 |
| 2009/0316382 | A1* | 12/2009 | Birman | G02B 6/0006 362/23.07 |

FOREIGN PATENT DOCUMENTS

JP          4585390 B2    9/2010

* cited by examiner

*Primary Examiner* — Elmito Breval
(74) *Attorney, Agent, or Firm* — Holtz, Holtz & Volek PC (57) ABSTRACT

A light guide guides light emitted by a light source to a portion around an illumination target. The light guide includes a light incident portion that the light emitted by the light source enters; a light emitting portion that is provided around the illumination target and emits the light that has entered; and a light distributing portion that distributes the light that has entered from the light source directly toward the light emitting portion and has at least a curved surface shape. The light incident portion is arranged at a position facing a light emitting surface of the light source and has a width so as to cover at least the light emitting surface of the light source.

6 Claims, 13 Drawing Sheets

LIGHT GUIDE AND LIGHT EMITTING DEVICE

BACKGROUND

Technological Field

The present invention relates to a light guide and a light emitting device.

Description of the Related Art

Conventionally, in order that a switch provided on the dashboard of vehicles such as automobiles can be easily seen by a passenger even when the inside of the vehicle is dark, such as at night, a portion around the switch as the illumination target may be illuminated. For example, a light guide provided around the back surface of a rotary switch of an air conditioner has a light source on a part of a circumference of a circle centered on the rotary switch. The light source emits light that is refracted or reflected by a condenser lens or an outward protruding portion, reflected again by an inclined surface, and emitted from the front surface of the rotary switch to illuminate the nameplate with symbols (see JP 4585390 B2).

However, because the light emitted by the light source directly to the front surface cannot be controlled in the light guide of JP 4585390 B2, the light intensity may not be uniform around the rotary switch.

SUMMARY

An object of the present invention is to make the light intensity uniform around an illumination target.

In order to solve the above problems, according to an aspect of the present invention, there is provided a light guide that guides light emitted by a light source to a portion around an illumination target, the light guide including:

a light incident portion that the light emitted by the light source enters;

a light emitting portion that is provided around the illumination target and emits the light that has entered; and a light distributing portion that distributes the light that has entered from the light source directly toward the light emitting portion and has at least a curved surface shape, wherein the light incident portion is arranged at a position facing a light emitting surface of the light source and has a width so as to cover at least the light emitting surface of the light source.

According to another aspect of the present invention, there is provided a light emitting device, including:

the light guide according to claim 1;
the light source; and
the illumination target.

DESCRIPTION OF THE PREFERRED EMBODIMENTS

Hereinafter, an embodiment, a first modification, and a second modification according to the present invention will be described in detail with reference to the attached drawings. However, the scope of the invention is not limited to the illustrated examples.

Embodiment

Figure 1:
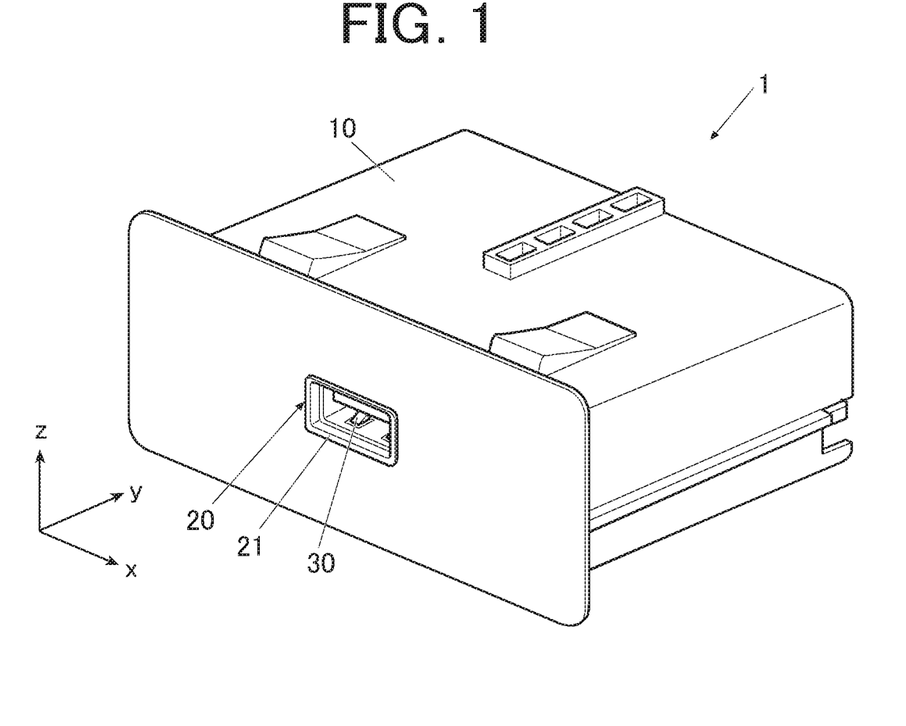
FIG. 1 is a perspective view showing an appearance of a connector box of an embodiment of the present invention.
Figure 2:
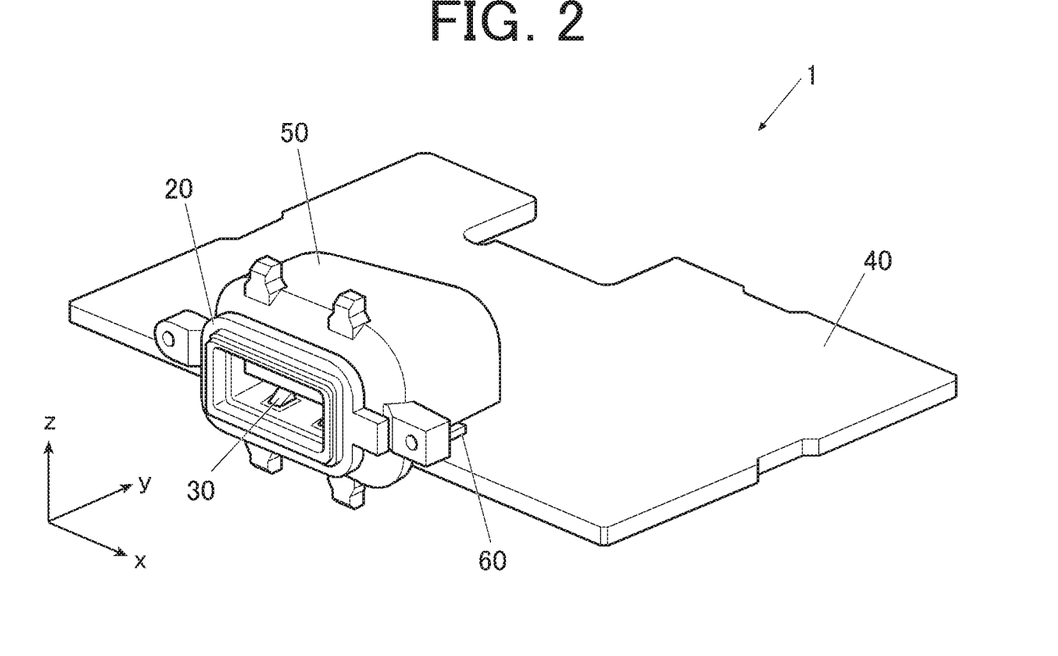
FIG. 2 is a perspective view showing internal structures of the connector box of the present embodiment.

An embodiment according to the present invention will be described with reference to FIG. 1 to FIG. 8B. First, with reference to FIG. 1 and FIG. 2, a connector box 1 of the present embodiment will be described. FIG. 1 is a perspective view showing an appearance of the connector box 1. FIG. 2 is a perspective view showing internal structures of the connector box 1.

As shown in FIG. 1, a connector box 1 as a light emitting device of the present embodiment is attached to an instrument panel of a vehicle such as an automobile, has an insertion port of a USB (Universal Serial Bus) insertion part 30 as an illumination target, and provides a USB device such as a smartphone connected to the insertion port with a charging function, a communication relay function, and the like. The connector box 1 includes a housing 10. The housing 10 stores various parts inside.

In the connector box 1, the insertion part 30 and a part of a diffusion plate 20 are exposed at the front surface (−y direction side) of the housing 10. A portion of the diffusion plate 20 that is exposed at the front surface of the housing 10 is a light emitter 21. The light emitter 21 emits light such that a passenger can turn his eyes to the insertion part 30 even when the inside of the vehicle is dark such as at night.

FIG. 2 shows the connector box 1 without the housing 10 that includes, as the internal structures, the diffusion plate 20, the insertion part 30, a substrate 40, a light guide 50, and an LED (Light Emitting Diode) 60 as a light source.

The insertion part 30 and the LED 60 are implemented on the substrate 40. The substrate 40 is a PCB (Printed Circuit Board) on which a patterned circuit connected to the insertion part 30 and the LED 60 is wired and various circuit elements are implemented. The LED 60 is, for example, a white light emitting diode using a phosphor. The LED 60 to be used may include, for example, red, blue, and green LEDs to output white light obtained by mixing lights of three colors. The light source is not limited to LEDs.

The light guide 50 is a cylindrical part made of a transparent resin such as polycarbonate or acrylic and has a function of guiding the light emitted by the LED 60 to the insertion port of the insertion part 30 (in the front direction (−y direction)). Therefore, the light guide 50 is arranged above (in the +z direction side) the LED 60 and around the insertion part 30.

The diffusion plate 20 is provided around the insertion port of the insertion part 30, diffuses the light (blurs the light) guided by the light guide 50 at the light emitter 21, and emits the light from the light emitter 21. The diffusion plate 20 is made of, for example, a material of a diffusion grade in which transparent resin such as polycarbonate is mixed with ceramics.

Figure 3A:
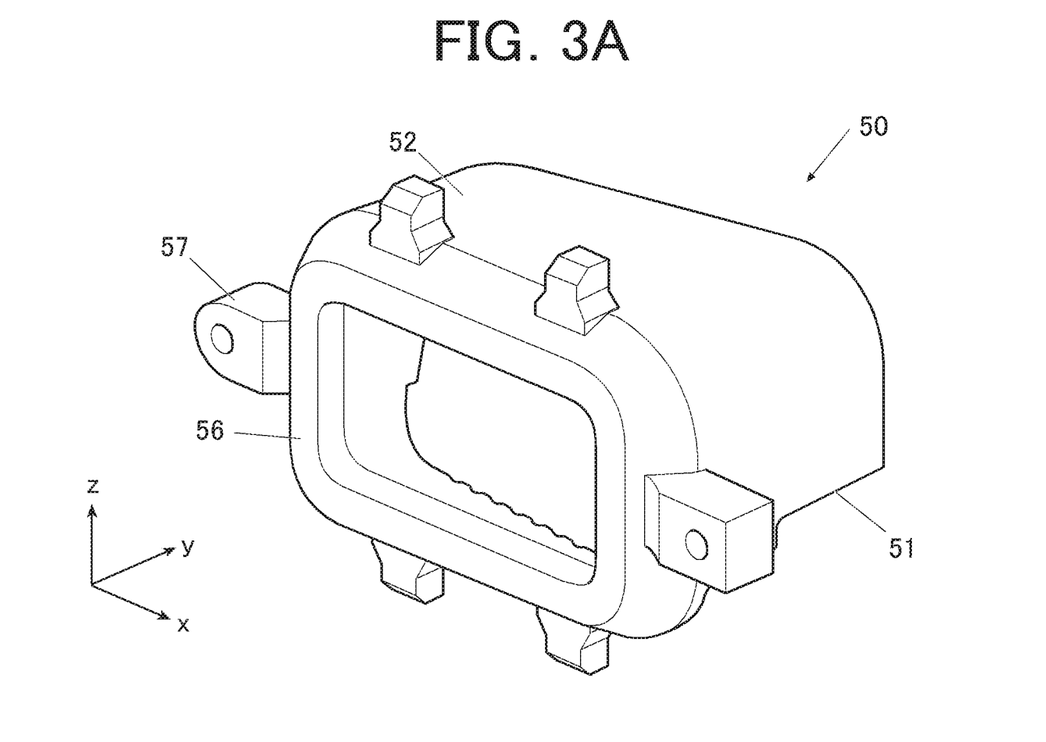
FIG. 3A is a perspective view of a light guide viewed from the front side.
Figure 3B:
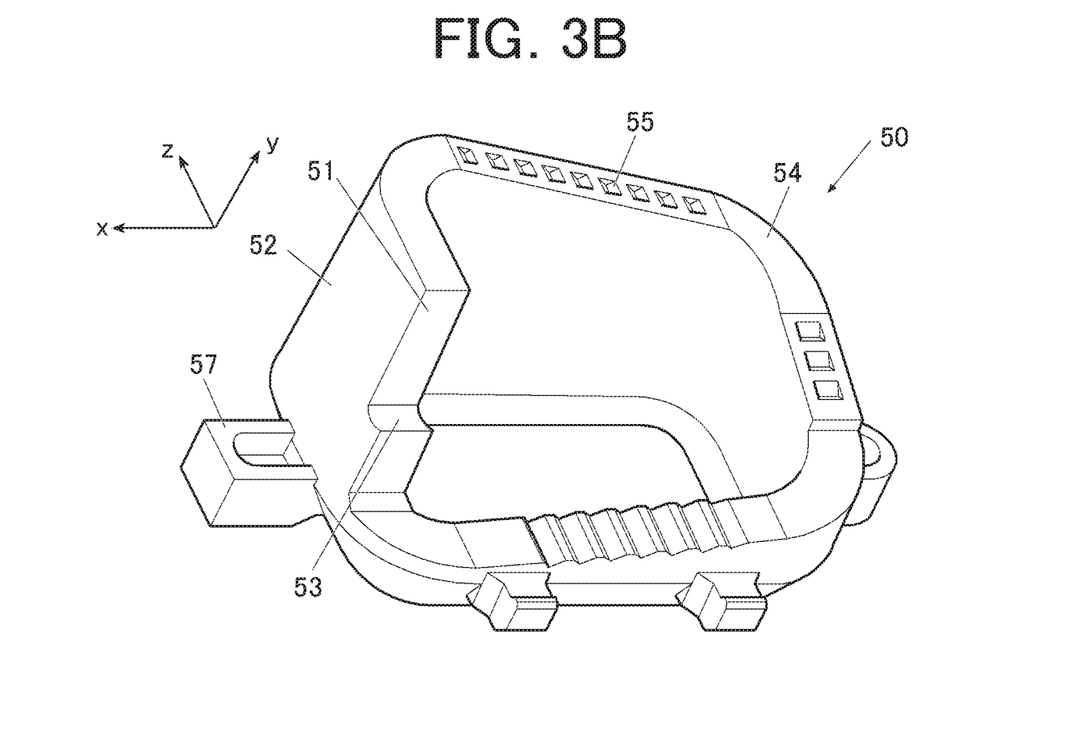
FIG. 3B is a perspective view of the light guide viewed from the rear side.

The light guide 50 will be described with reference to FIG. 3A and FIG. 3B. FIG. 3A is a perspective view of the light guide 50 viewed from the front side. FIG. 3B is a perspective view of the light guide 50 viewed from the rear side.

As shown in FIG. 3A and FIG. 3B, the light guide 50 integrally has a light incident portion 51, a light guiding portion 52, a light distributing portion 53, a reflecting portion 54, a cutout portion(s) 55, a light emitting portion 56, and a protruding portion 57. The light incident portion 51 is a portion on which the light emitted by the LED 60 enters, and is configured with, for example, a surface parallel to the upper surface of the LED 60. The light guiding portion 52 is formed in a substantially cylindrical shape having an axis in the y-axis direction, guides the light that has entered the light incident portion 51 to the reflecting portion 54 and the cutout portions 55, and guides the light having reflected by the reflecting portion 54 and the cutout portions 55 to the light emitting portion 56.

The light distributing portion 53 is provided at a position facing the front surface (on the −y direction side) of the LED 60, has a concave cylindrical lens shape as a curved surface shape extending in the x direction, and distributes the light entering from the LED 60 directly toward the light emitting portion 56. The reflecting portion 54 is a reflecting surface provided on the rear side (on the +y direction side) of the light guiding portion 52, formed in a spiral shape having an axis in the −y direction, and reflects the light that has entered the light incident portion 51 and travelling through the light guiding portion 52 to the light emitting portion 56. The cutout portions 55 are reflecting surfaces formed in the reflecting portion 54 and reflect the light guided by the light guiding portion 52 in a direction perpendicular to the light emitting portion 56 (in the −y direction). The light emitting portion 56 is provided on the front surface (on the −y direction side) of the light guiding portion 52, has the diffusion plate 20 attached thereto, and emits the light distributed by the light distributing portion 53 and the light reflected by the reflecting portion 54 and the cutout portions 55 to the diffusion plate 20 through the light guiding portion 52. The protruding portion 57 is gripped when the light guide 50 is attached.

Figure 4:
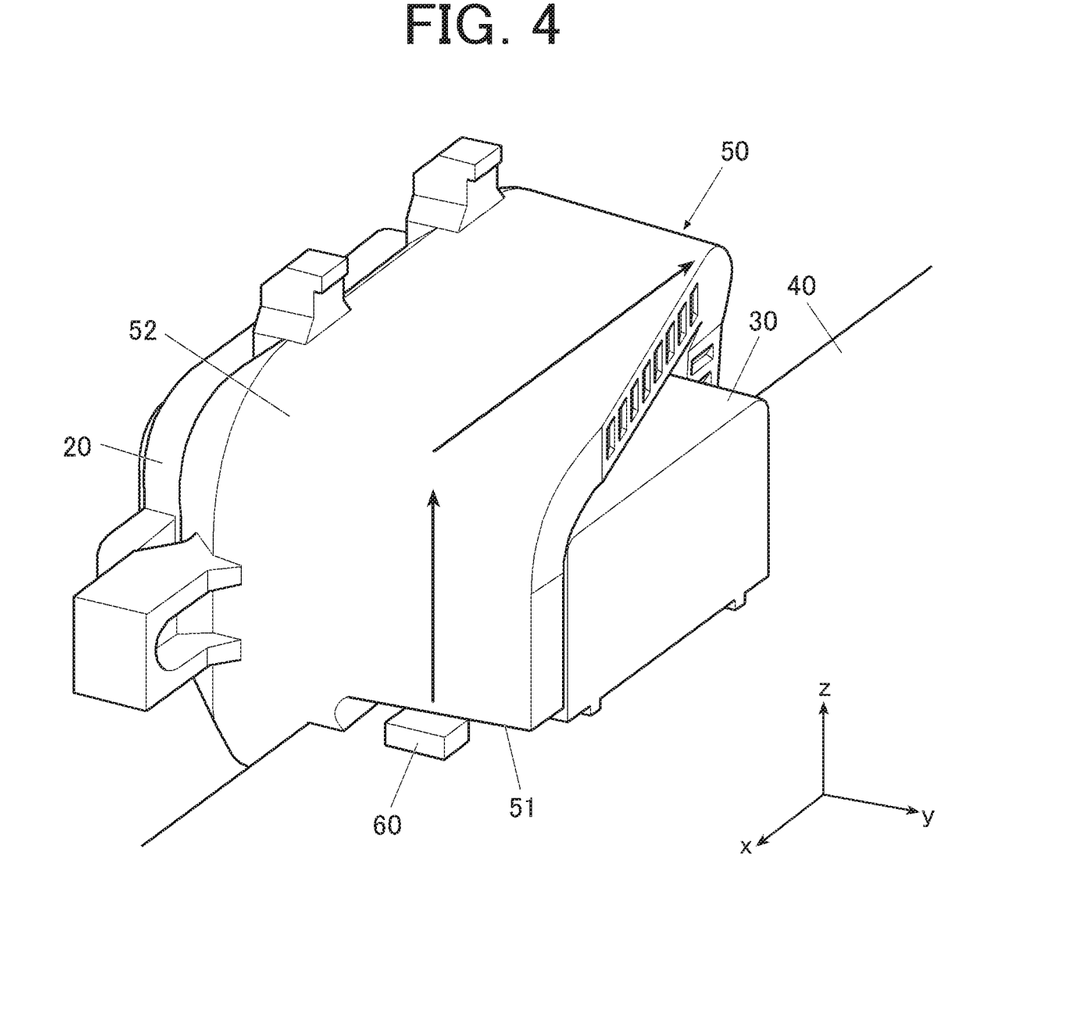
FIG. 4 is a perspective view showing a path of light in a light guiding portion emitted by an LED.
Figure 5A:
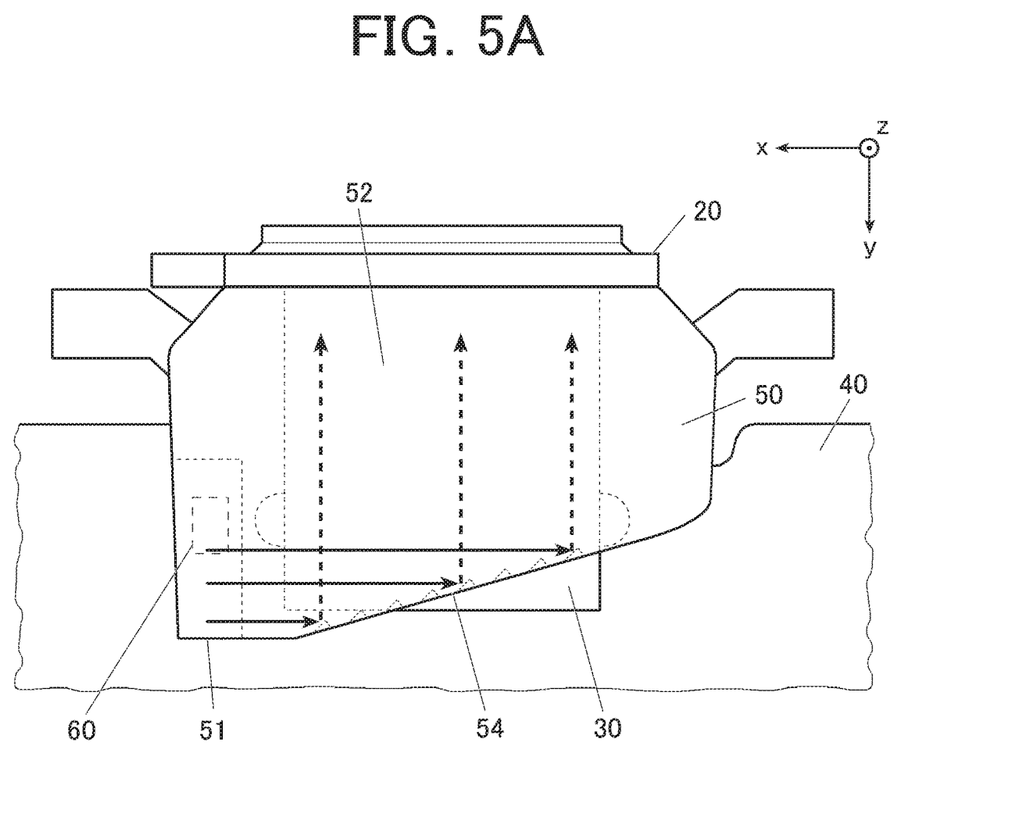
FIG. 5A is a plan view showing a reflection path of light that enters from LED.
Figure 5B:
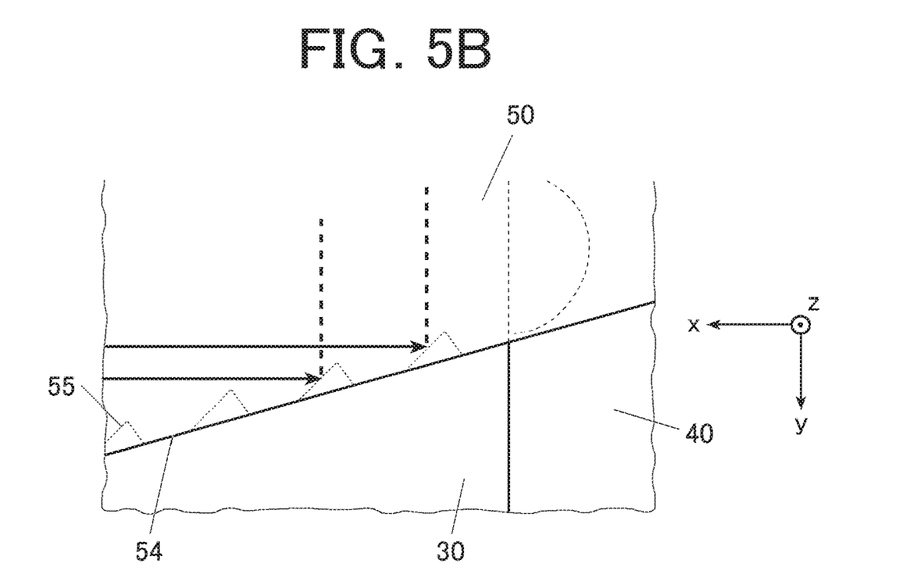
FIG. 5B is an enlarged plan view showing the reflection path of the light emitted by the LED.

Next, a light reflection path in the light guide 50 will be described with reference to FIG. 4, FIG. 5A, and FIG. 5B. FIG. 4 is a perspective view showing a path of light in the light guiding portion 52 emitted by the LED 60. FIG. 5A is a plan view showing a reflection path of the light that has entered from the LED 60. FIG. 5B is an enlarged plan view showing the reflection path of the light emitted by the LED 60.

As shown in FIG. 4, the light emitted by the LED 60 enters the light incident portion 51 of the light guide 50, and is guided so as to travel through the light guiding portion 52 along the xz plane as indicated by the arrows in the drawing. As shown in FIG. 5A, when viewed from above, the width (dimension in the x direction) (and a shape) and arrangement of the light incident portion 51 are set so as to cover at least the light emitting surface on the upper surface of the LED 60.

As shown in FIG. 5A and FIG. 5B, the reflecting portion 54 has a spiral shape with cutout portions 55. Therefore, the light that has entered the light incident portion 51 into the light guiding portion 52 is reflected by the reflecting portion 54 and the cutout portions 55 part by part and is emitted toward the front surface (in the −y direction). As a result, the light uniformly enters the light emitting portion 56, and is uniformly emitted by the light emitter 21 of the diffusion plate 20.

Figure 6A:
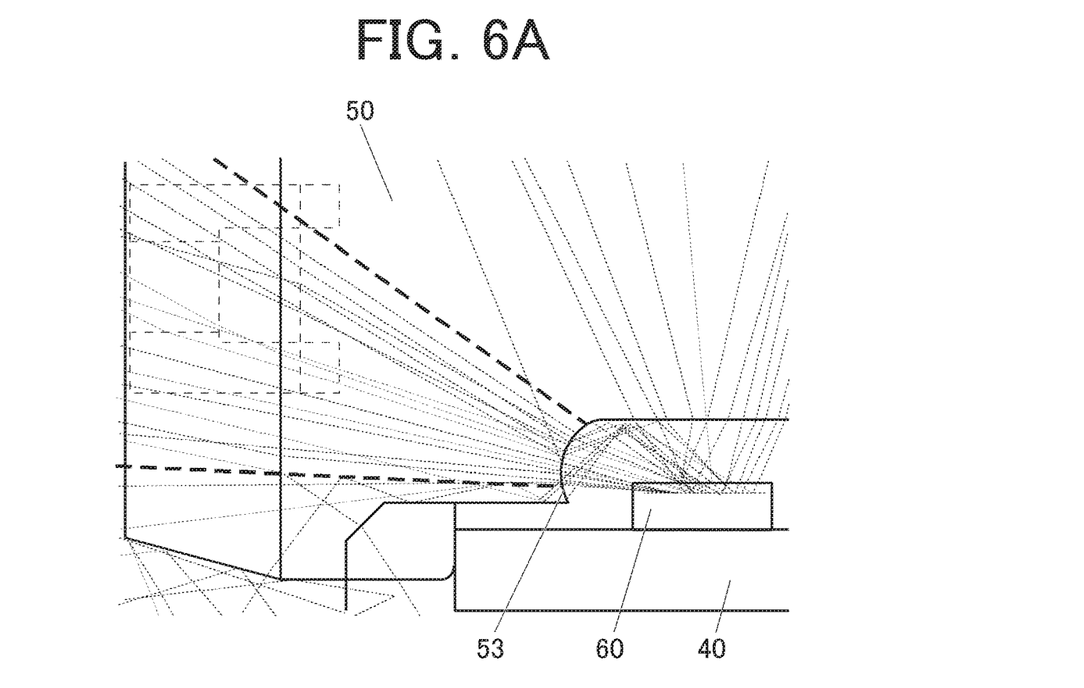
FIG. 6A is a side view showing light paths in the light guide of the present embodiment having a first light distributing portion.
Figure 6B:
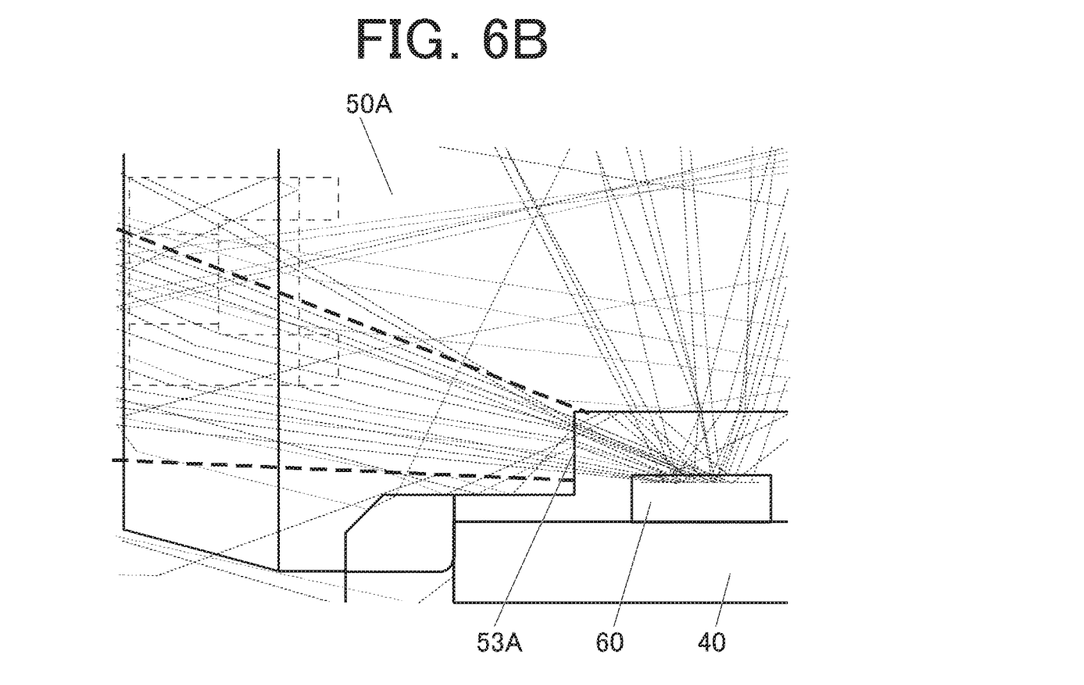
FIG. 6B is a side view showing light paths in light guide having a second light distributing portion.
Figure 7A:
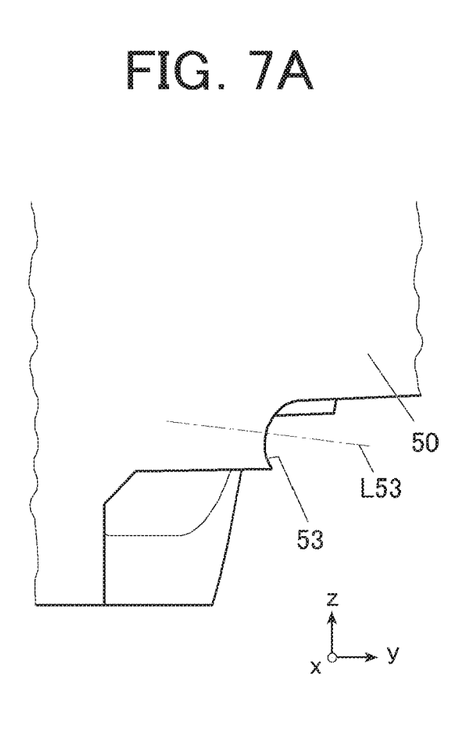
FIG. 7A is a side view showing an optical axis of the light distributing portion of the present embodiment.
Figure 7B:
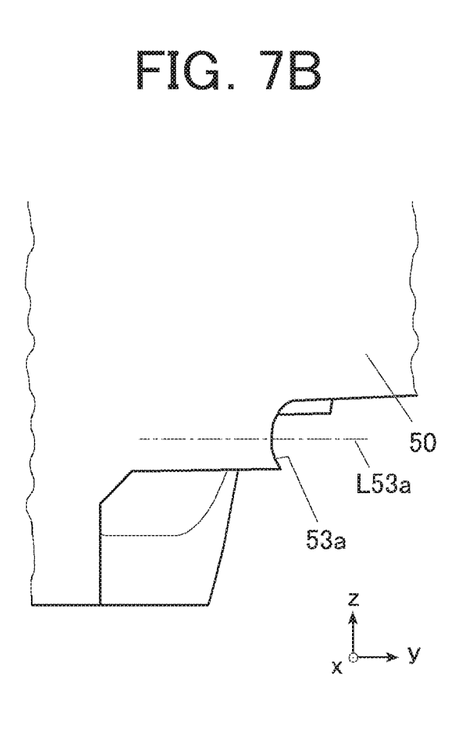
FIG. 7B is a side view showing an optical axis of a light distributing portion having a different optical axis.
Figure 7C:
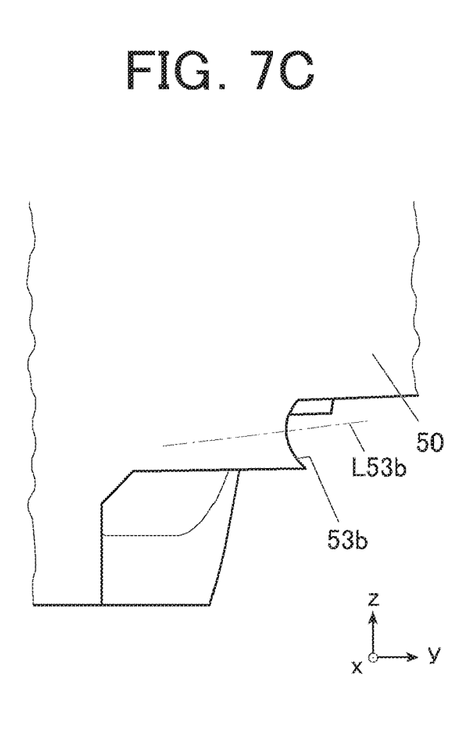
FIG. 7C is a side view showing an optical axis of the light distributing portion having a different optical axis.

Next, with reference to FIG. 6A to FIG. 7C, functions and settings of the light distributing portion 53 will be described. FIG. 6A is a side view showing light paths in the light guide 50 of the present embodiment having the light distributing portion 53. FIG. 6B is a side view showing light paths in the light guide 50A having a planer light distributing portion 53A. FIG. 7A is a side view showing an optical axis L53 of the light distributing portion 53 of the present embodiment. FIG. 7B is a side view showing an optical axis L53a of the light distributing portion 53a. FIG. 7C is a side view showing an optical axis L53b of the light distributing portion 53b.

As shown in FIG. 4, because the light emitted by the LED 60 directly reaches a portion close to the LED 60 in the light emitting portion 56 without passing through the reflecting portion 54 or the cutout portions 55, it is difficult to control light intensity only with the light guiding portion 52. Therefore, the light guide 50 has the light distributing portion 53.

As shown in FIG. 6B, the light emitted by the LED 60 is directly incident on a portion that is usually formed as a planar light distributing portion 53A in a light guide. A light guide having the light distributing portion 53A is assumed to be the light guide 50A. In FIG. 6B, dotted lines represent the light emitted by the LED 60, and the broken lines represent the spread of the light distribution to the light emitting portion 56 via the light distributing portion 53A. Since the spread angle of the light distribution to the light emitting portion 56 is small, the light intensity may not be uniform in the light emitting portion 56 and the light emitter 21 of the diffusion plate 20.

As shown in FIG. 6A, in the light guide 50 of the present embodiment, the light emitted by the LED 60 is refracted by the lens-shaped light distributing portion 53 and distributed. The light distributing portion 53 has a lens shape that is concave in a direction from the light emitting portion 56 to the light incident portion 51 (in the +y direction). The light guide 50 having the light distributing portion 53 is used in this way. In FIG. 6A, dotted lines represent the light emitted by the LED 60, and the broken lines represent the spread of the light distribution to the light emitting portion 56 via the light distributing portion 53. By using the light distributing portion 53, the spread angle of the light distribution to the light emitting portion 56 can be controlled to be larger than by using the light distributing portion 53A. As a result, it is possible to distribute the light such that the light intensity at the light emitting portion 56 (light emitter 21 of the diffusion plate 20) is uniform.

As shown in FIG. 7A, in the light guide 50 of the present embodiment, the optical axis L53 of the light distributing portion 53 is inclined upward (to the +z direction) away from the y axis. Alternatively, in order to make the light intensity further uniform in the light emitting portion 56 (the light emitter 21 of the diffusion plate 20), the light guide 50 of the present embodiment may be designed, as shown in FIG. 7B, to have the light distributing portion 53a instead of the light distributing portion 53. The optical axis L53a of the light distributing portion 53a is parallel to the y axis. Alternatively, the light guide 50 may be designed, as shown in FIG. 7C, to have the light distributing portion 53b instead of the light distributing portion 53. The optical axis L53b of the light distributing portion 53b is inclined downward (to the −z direction) at the front side (on the −y direction side) away from the y axis.

Figure 8A:
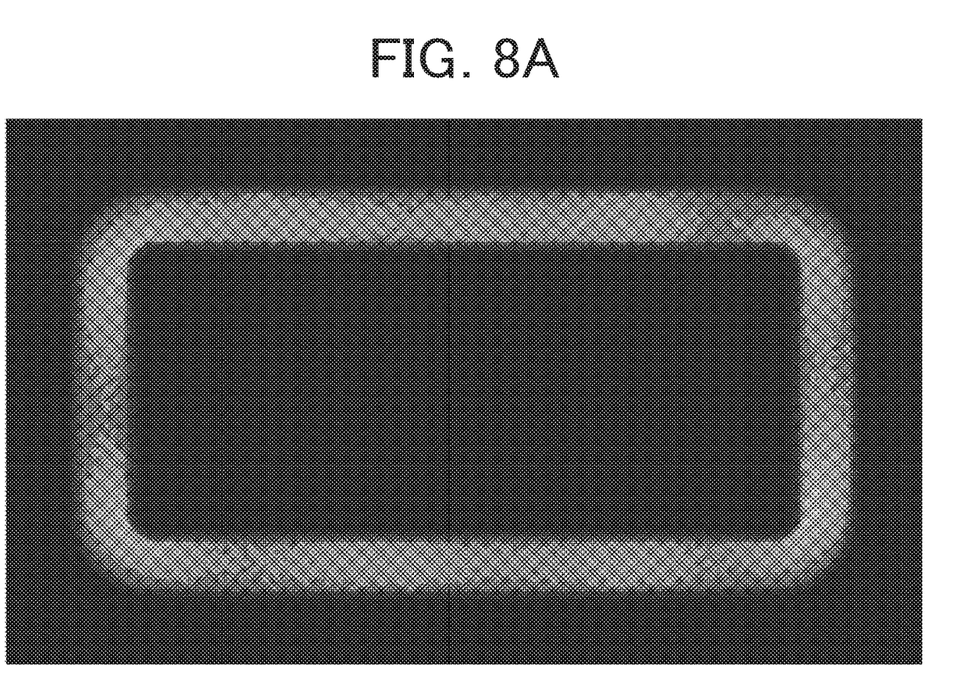
FIG. 8A is a diagram showing intensity distribution of light emitted by the light emitter when a light guide having the first light distributing portion is used.
Figure 8B:
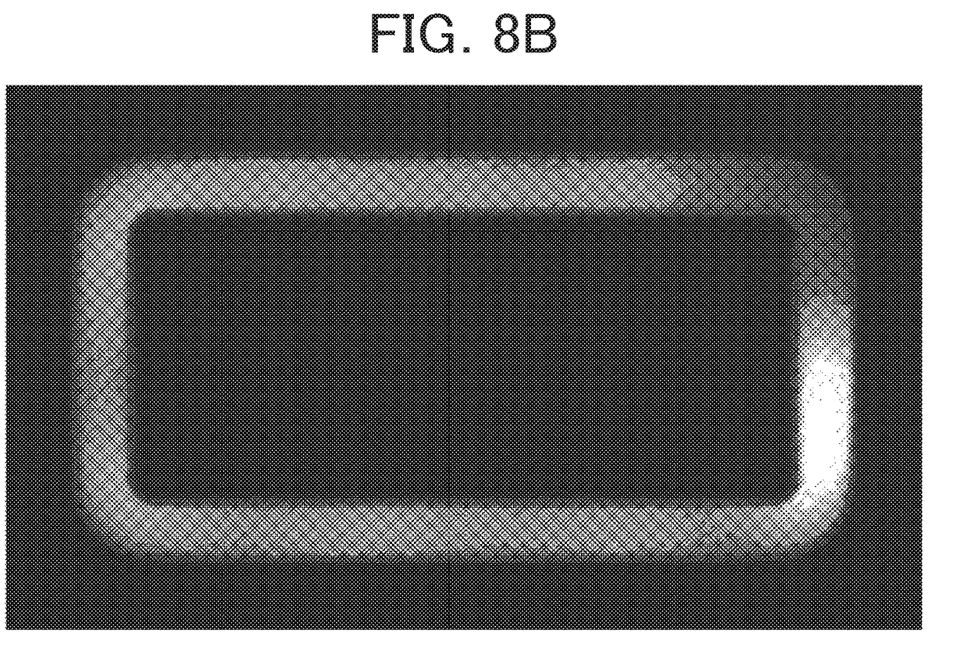
FIG. 8B is a diagram showing intensity distribution of light emitted by the light emitter when a light guide having the second light distributing portion is used.

Next, with reference to FIG. 8, the uniformity of light emission at the light emitter 21 of the diffusion plate 20 of the connector box 1 will be described. FIG. 8A is a diagram showing intensity distribution of light emitted by the light emitter 21 when the light guide 50 having the light distributing portion 53 is used. FIG. 8B is a diagram showing intensity distribution of light emitted by the light emitter 21 when the light guide 50A having the light distributing portion 53A is used.

FIG. 8A shows the result of simulating the light intensity at the light emitter 21 viewed from the front side of the diffusion plate 20 of the connector box 1 when the light guide 50 is used. In FIG. 8A, the increase in the light emission intensity is represented by a gradual change from black to white, such as black--> . . . -->gray--> . . . -->white, and the LED 60 is arranged near the right side of the light emitter 21. These are the same in FIG. 8B.

In the connector box 1 using the light guide 50, as shown in FIG. 8A, the light emission intensity (luminance) is uniform at the light emitter 21. FIG. 8B shows the result of simulating the light intensity at the light emitter 21 viewed from the front side of the diffusion plate 20 of the connector box 1 when the light guide 50A shown in FIG. 6B is used. In the connector box 1 using the light guide 50A without the lens-shaped light distributing portion 53, the light intensity is not uniform at the light emitter 21 but is particularly large near the LED 60. Even when the light guide 50A is not used, inappropriate light distribution with a light distributing portion may also cause results similar to that in FIG. 8B.

In the light guide 50 of the present embodiment, a light distributing portion is preferably adopted such that the light intensity is most uniform based on simulation of light intensity at the light emitter 21 as in FIG. 8A and FIG. 8B. Simulation is preferably made for respective light distributing portions with different optical axis directions such as the light distributing portions 53, 53a, and 53b respectively in FIG. 7A, FIG. 7B, and FIG. 7C, or with different lens diameters.

As described above, according to the present embodiment, the light guide 50 includes the light incident portion 51 that the light emitted by the LED 60 as the light source enters, the light emitting portion 56 that is provided around the USB insertion part 30 as the illumination target and emits the light entering the light incident portion 51, and the light distributing portion 53 that distributes the light emitted by the LED 60 directly toward the light emitting portion 56 and has at least a lens shape. The light incident portion 51 is arranged at a position facing the light emitting surface of the LED 60, and has a width (dimension in the x direction) (and a shape) so as to cover at least the light emitting surface of the LED 60. The connector box 1 includes the light guide 50, the LED 60, and the USB insertion part 30.

Therefore, because of the light distribution at the light distributing portion 53, the light intensity near the LED 60 can be controlled such that the light intensity in the light emitting portion 56, around the USB insertion part 30, can be uniform. At the same time, the light incident portion 51 prevents leakage of light from the LED 60. At the same time, the light guide 50 can be readily molded because of the thick resin at the light incident portion 53.

The light guide 50 further includes the reflecting portion 54 that reflects light toward the light emitting portion 56, and the cylindrical light guiding portion 52 that guides the light that has entered the light incident portion 51 to the reflecting portion 54. The reflecting portion 54 is formed along an axis of the light guiding portion 52 (y axis) and has a spiral shape. Therefore, the light that has entered the light incident portion 51 is reflected by the reflecting portion 54 part by part and emitted to the light emitting portion 56, such that the light intensity around the USB insertion part can be further uniform.

The light guide 50 further includes the cutout portions 55 that are formed in the reflecting portion 54 and reflect the light that has entered from the LED 60 toward the light emitting portion 56, along the axis of the light guiding portion 52. Therefore, the light that has entered the light incident portion 51 is reflected by the cutout portions 55 and is reliably emitted toward the light emitting portion 56, such that the light intensity around the USB insertion part 30 can be further uniform.

Figure 9:
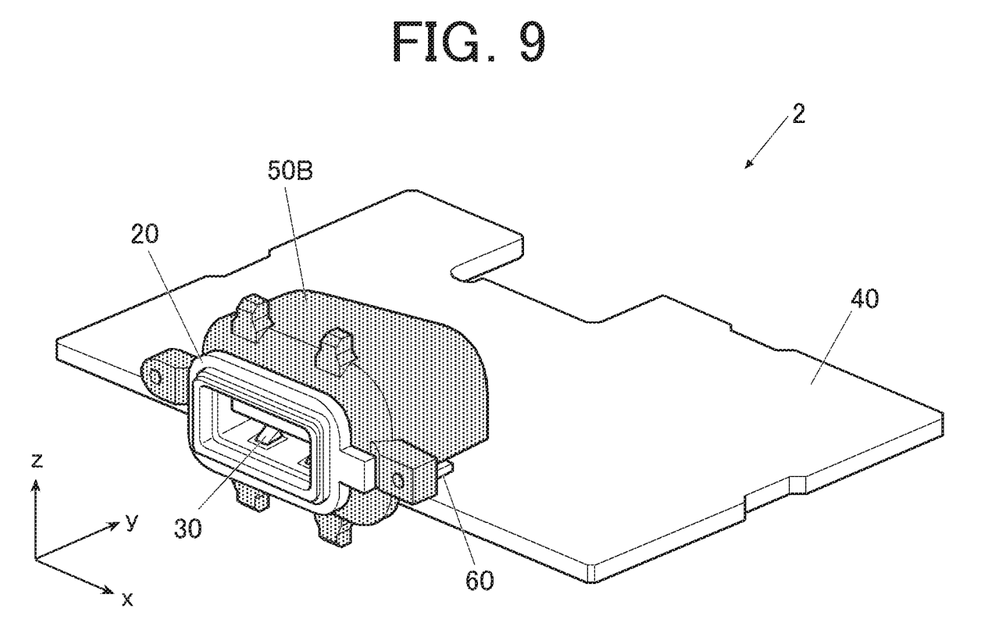
FIG. 9 is a perspective view showing internal structures of a connector box of a first modification.

(First Modification) A first modification of the above embodiment will be described with reference to FIG. 9. FIG. 9 is a perspective view showing internal structures of the connector box 2 of this modification.

The connector box, depending on the model, needs to be illuminated in a color other than white. The LED 60 is a white LED in the above embodiment, but may be a multi-color LED for red, blue, and green for emitting light having a color other than white, for example, where the light emission intensity can be controlled for LED elements of each color. Alternatively, an LED that emits a desired color may be used. However, in the multicolor LED, the position of the LED element is different for each color, and the light is differently distributed for each color. Therefore, it is necessary to change the design of the light guide 50. In particular, the light is likely to be uniform when emitted by LED elements of two or more colors at the same time. The same problem is also likely to occur in using the LED that emits a desired color due to change in light distribution. Accordingly, the connector box 2 is used in this modification.

The connector box 2 of this modification includes a housing 10 as well as the connector box 1, and has an appearance similar to the connector box 1. FIG. 9 shows the connector box 1 without the housing 10 that includes, as the internal structures, the diffusion plate 20, the insertion part 30, the substrate 40, the light guide 50B, and the LED 60.

The light guide 50B is made of a transparent resin such as polycarbonate or acrylic, and is colored corresponding to the desired color (for example, yellow) to be emitted. The LED 60 is a white LED. Therefore, the white light from the LED 60 having entered the light guide 50B has the desired color (yellow) when emitted from the light guide 50B as a result of passing through the light guide 50B.

As described above, according to this modification, the LED 60 as the light source emits white light. The light guide 50B is made of a transparent material colored in a desired color. Even when the light emitted around the illumination target is to have a desired color, the color (wavelength) of the light emitted by the LED 60 is not changed, accordingly, the light distribution from the LED 60 is not changed. As a result, it is not necessary to change the design of the light guide, such that the light intensity having the desired color can be further uniform around the USB insertion part 30 by using the light guide 50B.

(Second Modification)

Figure 10A:
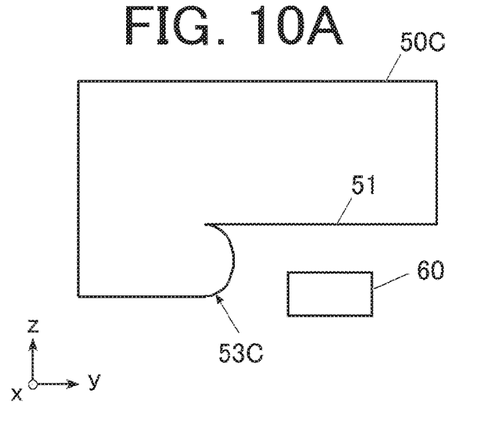
FIG. 10A is a side view showing a light guide having a third light distributing portion.
Figure 10B:
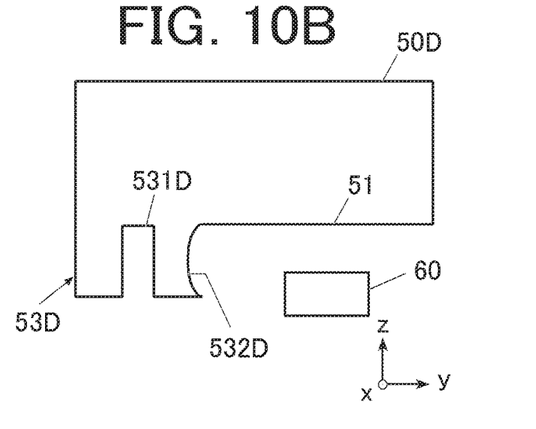
FIG. 10B is a side view showing a light guide having a fourth light distributing portion.
Figure 10C:
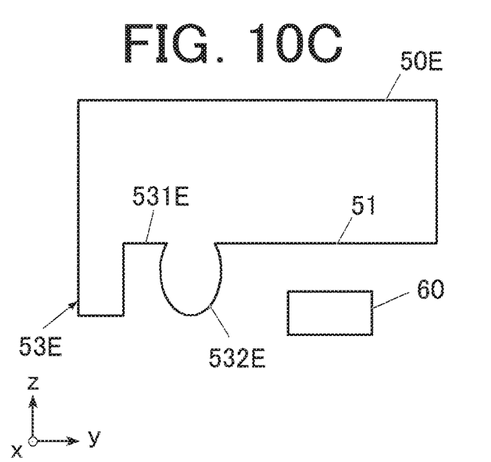
FIG. 10C is a side view showing a light guide having a fifth light distributing portion.
Figure 10D:
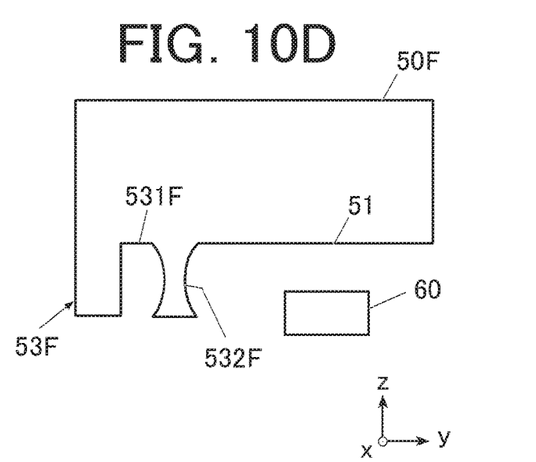
FIG. 10D is a side view showing a light guide having a sixth light distributing portion.
Figure 10E:
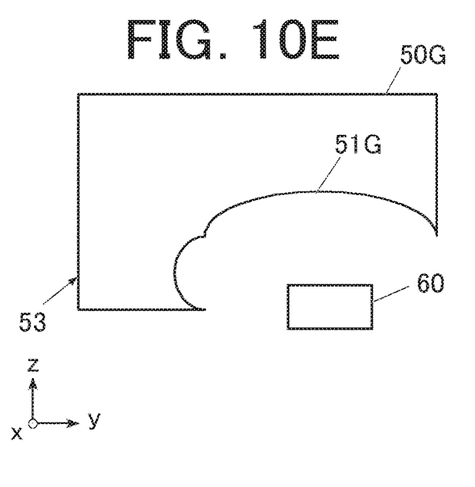
FIG. 10E is a side view showing a light guide having a second light incident portion.
Figure 10F:
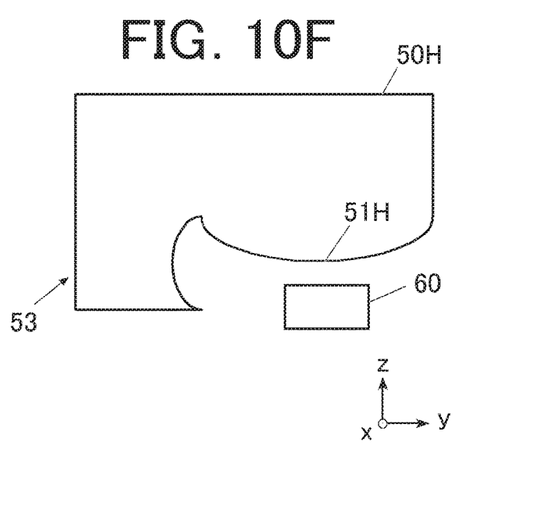
FIG. 10F is a side view showing a light guide having a third light incident portion.
Figure 11A:
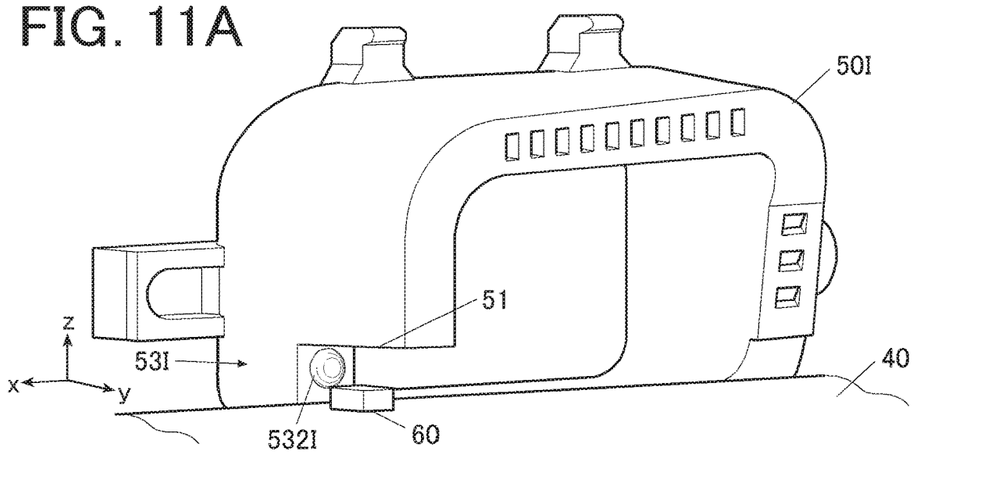
FIG. 11A is a perspective view showing a light guide having a seventh light distributing portion.
Figure 11B:
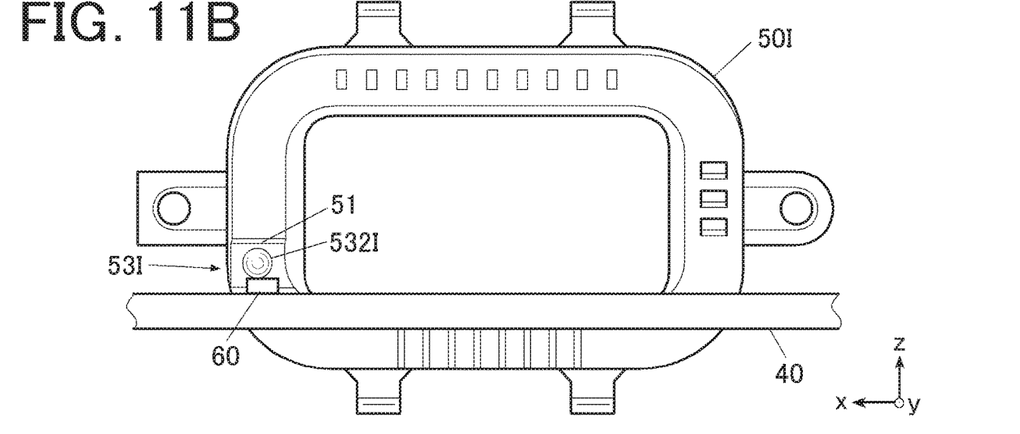
FIG. 11B is a rear view showing the light guide having the seventh light distributing portion.
Figure 11C:
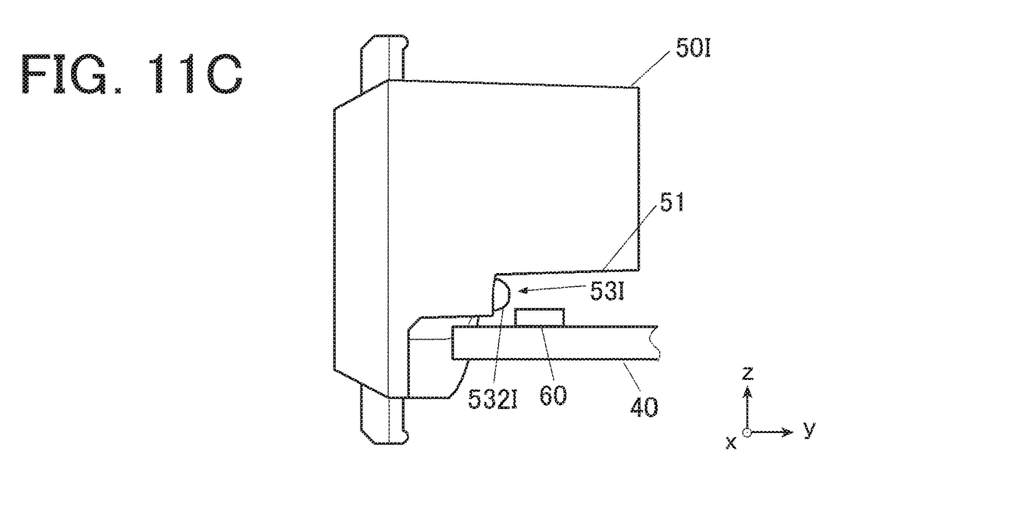
FIG. 11C is a side view showing the light guide having the seventh light distributing portion.
Figure 12A:
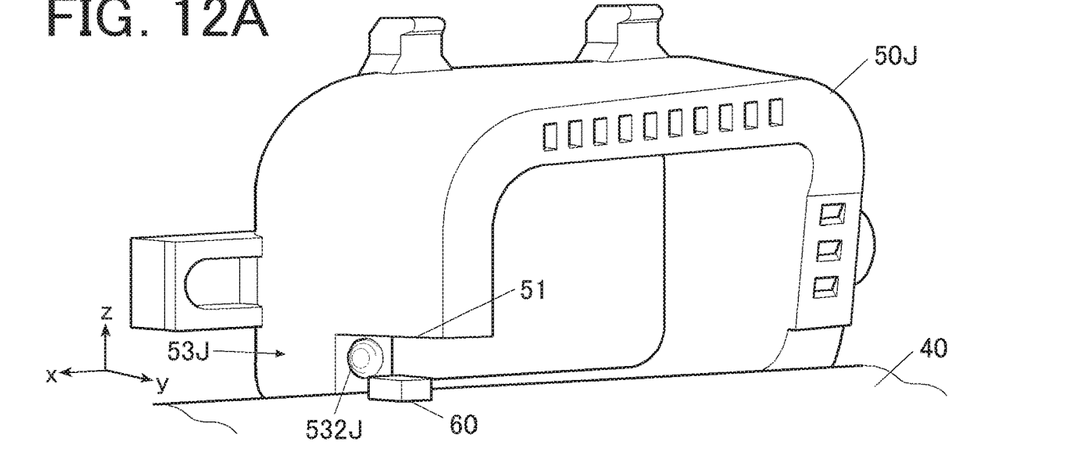
FIG. 12A is a perspective view showing a light guide having an eighth light distributing portion.
Figure 12B:
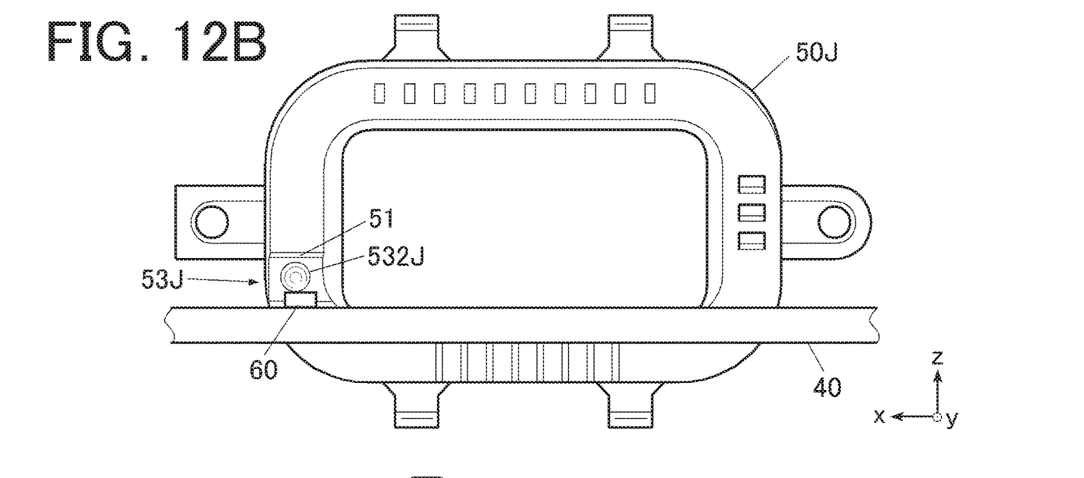
FIG. 12B is a rear view showing the light guide having the eighth light distributing portion.
Figure 12C:
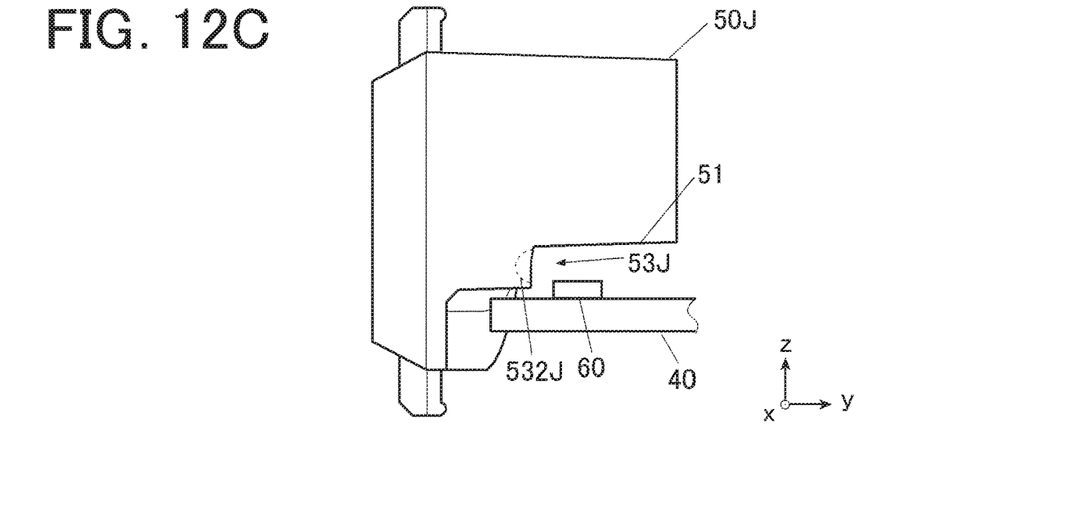
FIG. 12C is a side view showing the light guide having the eighth light distributing portion.
Figure 13A:
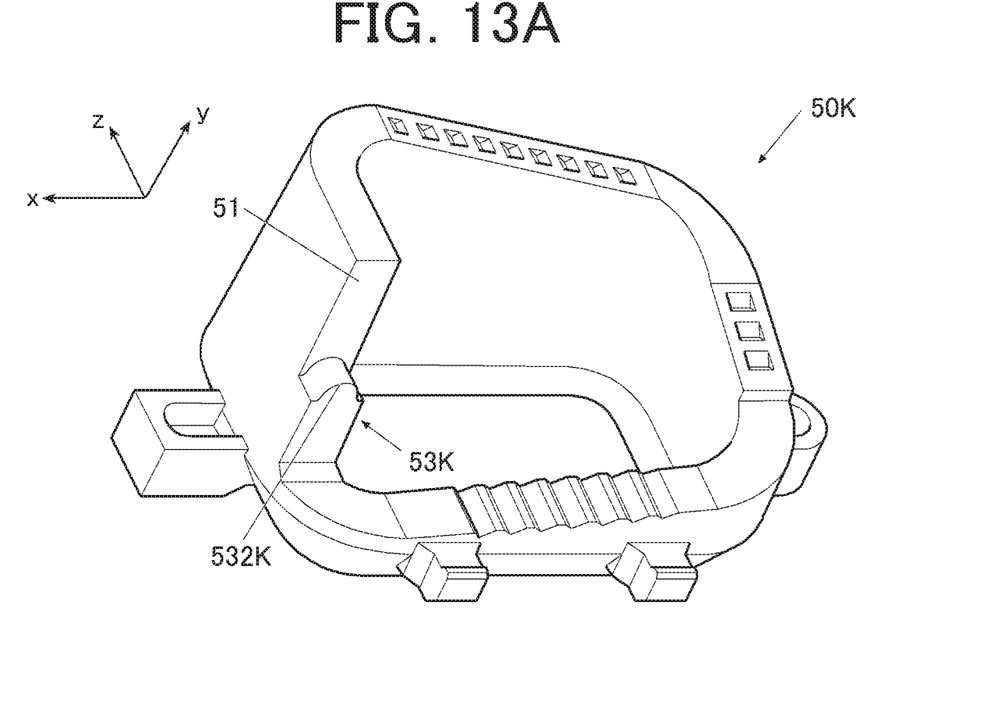
FIG. 13A is a perspective view of a light guide having a ninth light distributing portion viewed from the rear side.
Figure 13B:
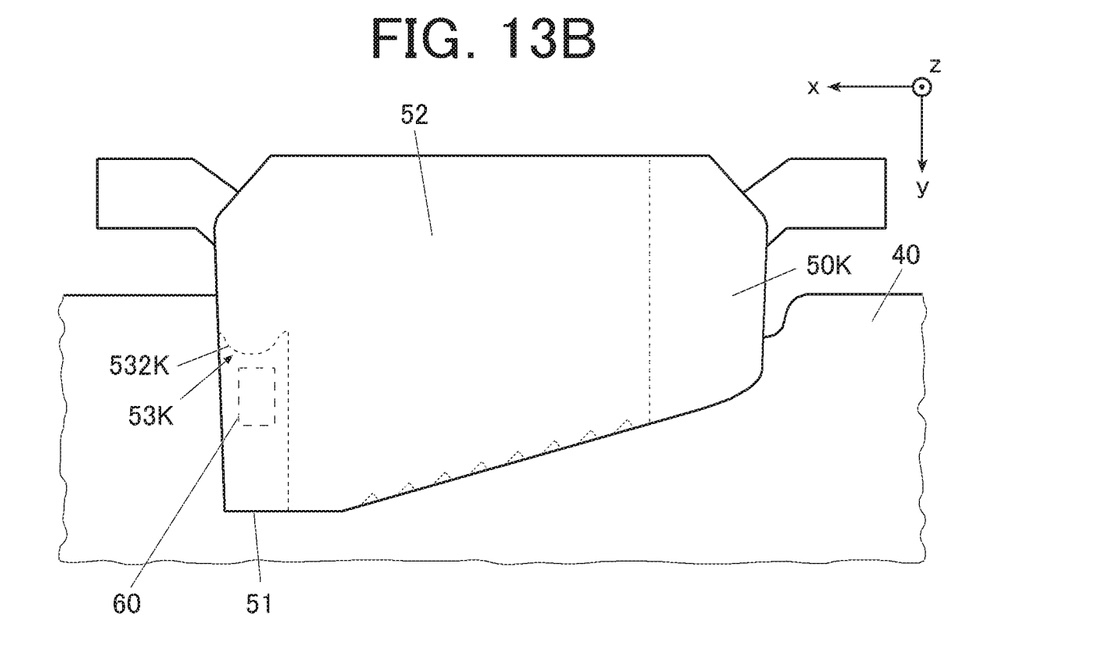
FIG. 13B is a top view showing the light guide having the ninth light distributing portion.
Figure 14A:
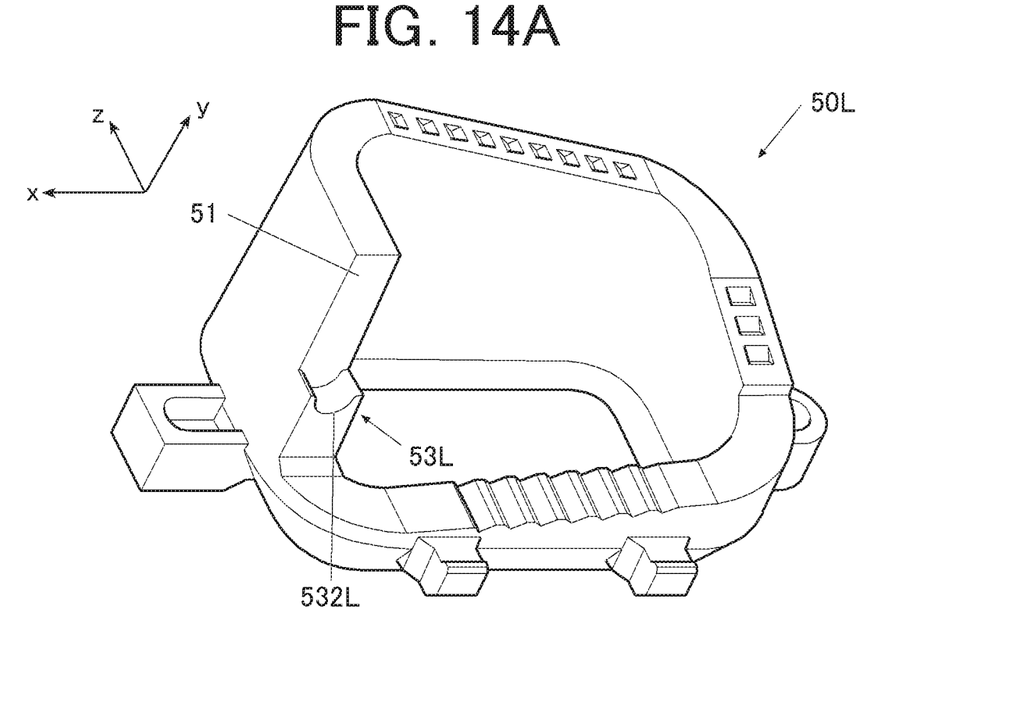
FIG. 14A is a perspective view of a light guide having a tenth light distributing portion viewed from the rear side.
Figure 14B:
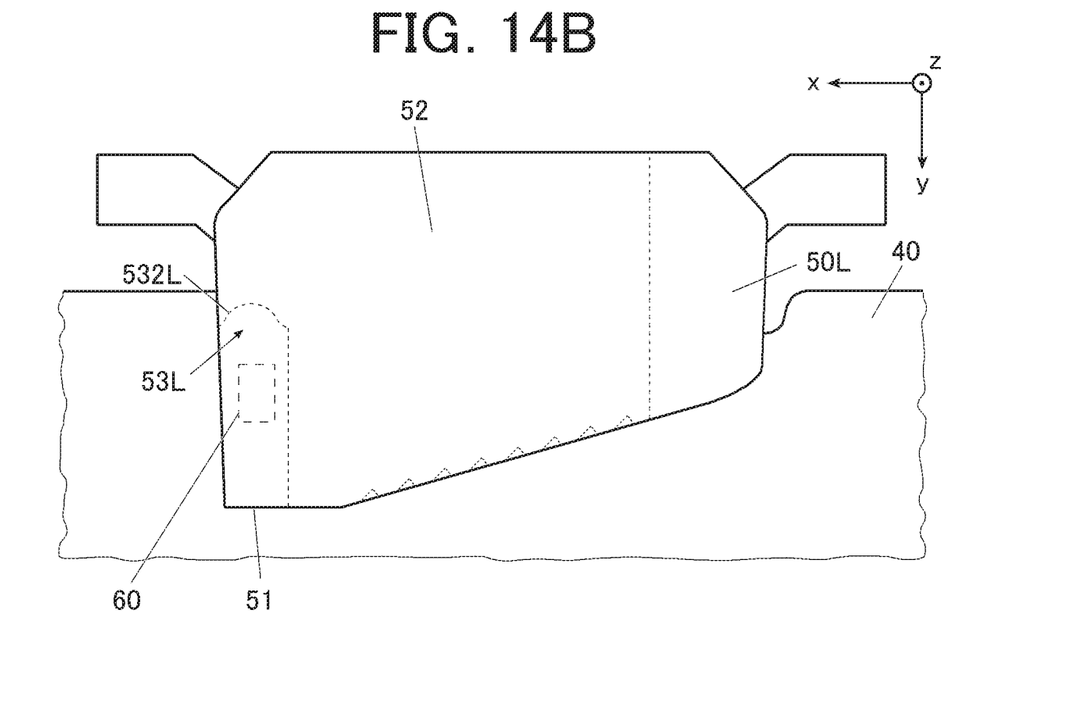
FIG. 14B is a top view showing the light guide having the tenth light distributing portion.

A modification of the light distributing portion 53 or the light incident portion 51 of the light guide 50 in the connector box 1 of the above embodiment will be described with reference to FIG. 10A to FIG. 14B. FIG. 10A is a side view showing a light guide 50C having a light distributing portion 53C. FIG. 10B is a side view showing a light guide 50D having a light distributing portion 53D. FIG. 10C is a side view showing a light guide 50E having a light distributing portion 53E. FIG. 10D is a side view showing a light guide 50F having a light distributing portion 53F. FIG. 10E is a side view showing a light guide 50G having a light incident portion 51G. FIG. 10F is a side view showing a light guide 50H having a light incident portion 51H. FIG. 11A is a perspective view showing a light guide 50I having a light distributing portion 53I. FIG. 11B is a rear view showing the light guide 50I having the light distributing portion 53I. FIG. 11C is a side view showing the light guide 50I having the light distributing portion 53I. FIG. 12A is a perspective view showing a light guide 50J having a light distributing portion 53J. FIG. 12B is a rear view showing the light guide 50J having the light distributing portion 53J. FIG. 12C is a side view showing the light guide 50J having the light distributing portion 53J. FIG. 13A is a perspective view of a light guide 50K having a light distributing portion 53K viewed from the rear side. FIG. 13B is a top view showing the light guide 50K having the light distributing portion 53K. FIG. 14A is a perspective view of a light guide 50L having a light distributing portion 53L viewed from the rear side. FIG. 14B is a top view showing the light guide 50L having the light distributing portion 53L.

In the connector box 1 of the above embodiment, the light guide 50 may be replaced with the light guide 50C shown in FIG. 10A. The light guide 50C has the light incident portion 51 and the light distributing portion 53C. The light distributing portion 53C is provided at a position facing the front surface (on the −y direction side) of the LED 60, has a cylindrical lens shape as a curved surface shape that is convex toward the LED 60 (in the +y direction) and extends in the x direction. While the light distributing portion 53 has a concave lens shape and has a function of expanding the light from the LED 60 in the z direction, the light distributing portion 53C has a convex lens shape and has a function of narrowing the light from the LED 60 in the z direction.

In the connector box 1 of the above embodiment, the light guide 50 may be replaced with the light guide 50D shown in FIG. 10B. The light guide 50D has the light incident portion 51 and the light distributing portion 53D. The light distributing portion 53D is provided at a position facing the front surface (on the −y direction side) of the LED 60 and has a slit portion 531D and a concave lens portion 532D. The slit portion 531D is a slit having no lens shape on the side of the light emitting portion 56 or on the side of the LED 60. The concave lens portion 532D has a lens shape as a curved surface shape that is convex toward the LED 60 (in the +y direction). The light distributing portion 53D has the concave lens portion 532D and the slit portion 531D and has a function of expanding the light from the LED 60 twice.

In the connector box 1 of the above embodiment, the light guide 50 may be replaced with the light guide 50E shown in FIG. 10C. The light guide 50E has the light incident portion 51 and the light distributing portion 53E. The light distributing portion 53E is provided at a position facing the front surface (on the −y direction side) of the LED 60 and has a slit portion 531E and a convex lens portion 532E. The slit portion 531E is a slit having a lens shape that is convex toward the LED 60 side (in the +y direction). The convex lens portion 532E has a lens shape that is convex toward the LED 60. The light distributing portion 53E has convex lens shapes at the convex lens portion 532E and the slit portion 531E and has a function of extremely narrowing the light from the LED 60, while having a function of expanding the light because of the slit portion 531E.

In the connector box 1 of the above embodiment, the light guide 50 may be replaced with the light guide 50F shown in FIG. 10D. The light guide 50F has the light incident portion 51 and the light distributing portion 53F. The light distributing portion 53F is provided at a position facing the front surface (on the −y direction side) of the LED 60 and has a slit portion 531F and a concave lens portion 532F. The slit portion 531F is a slit having a lens shape that is concave toward the LED 60 side. The concave lens portion 532F has a lens shape that is concave toward the LED 60. The light distributing portion 53F has concave lens shapes at the concave lens portion 532F and the slit portion 531F and has a function of extremely expanding the light from the LED 60, while having a function of further expanding the light because of the slit portion 531F.

In the connector box 1 of the above embodiment, the light guide 50 may be replaced with the light guide 50G shown in FIG. 10E. The light guide 50G has the light incident portion 51G and the light distributing portion 53. The light incident portion 51G is provided at a position above (in the +z direction of) the LED 60, has a cylindrical lens shape as a curved surface shape that is concave in the −z direction and extends in the x direction. The light incident portion 51G has a concave cylindrical lens shape and has a function of expanding the light from the LED 60 in the y direction, such that the expanded light is reflected by the reflecting portion 54 and the cutout portions 55.

In the connector box 1 of the above embodiment, the light guide 50 may be replaced with the light guide 50H shown in FIG. 10F. The light guide 50H has the light incident portion 51H and the light distributing portion 53. The light incident portion 51H is provided at a position above (in the +z direction of) the LED 60, has a cylindrical lens shape as a curved surface shape that is convex in the −z direction and that extends in the x direction. The light incident portion 51H has a convex cylindrical lens shape and has a function of narrowing the light from the LED 60 in the y direction, such that the narrowed light is reflected by the reflecting portion 54 and the cutout portions 55.

The shape of the light distributing portion is not limited to a concave or convex shape viewed from the x direction, but may be a concave or convex shape viewed from the z direction, or a curved surface shape of a concave or convex shape viewed from the z direction and the x direction. For example, in the connector box 1 of the above embodiment, the light guide 50 may be replaced with the light guide 50I shown in FIG. 11A, FIG. 11B, and FIG. 11C. The light guide 50I has the light incident portion 51 and the light distributing portion 531. The light distributing portion 531 is provided at a position facing the front surface (on the −y direction side) of the LED 60, and has a convex lens portion 5321. The convex lens portion 5321 has a spherical lens shape as a curved surface shape that is convex toward the LED 60 (in the +y direction). The light distributing portion 531 has the convex lens portion 5321 having a convex spherical lens shape and has a function of narrowing the light from the LED 60 in the xz plane direction.

In the connector box 1 of the above embodiment, the light guide 50 may be replaced with the light guide 50J shown in FIG. 12A, FIG. 12B, and FIG. 12C. The light guide 50J has the light incident portion 51 and the light distributing portion 53J. The light distributing portion 53J is provided at a position facing the front surface (on the −y direction side) of the LED 60, and has a concave lens portion 532J. The concave lens portion 532J has a spherical lens shape as a curved surface shape that is concave toward the LED 60 (in the +y direction). The light distributing portion 53J has the concave lens portion 532J having a concave spherical lens shape and has a function of expanding the light from the LED 60 in the xz plane direction.

In the connector box 1 of the above embodiment, the light guide 50 may be replaced with the light guide 50K shown in FIG. 13A and FIG. 13B. The light guide 50K has the light incident portion 51 and the light distributing portion 53K. The light distributing portion 53K is provided at a position facing the front surface (on the −y direction side) of the LED 60, and has a convex lens portion 532K. The convex lens portion 532K has a cylindrical lens shape as a curved surface shape that is convex toward the LED 60 (in the +y direction) and extends in the z direction. The light distributing portion 53K has the convex lens portion 532K having a convex cylindrical lens shape and has a function of narrowing the light from the LED 60 in the x direction.

In the connector box 1 of the above embodiment, the light guide 50 may be replaced with the light guide 50L shown in FIG. 14A and FIG. 14B. The light guide 50L has the light incident portion 51 and the light distributing portion 53L. The light distributing portion 53L is provided at a position facing the front surface (on the −y direction side) of the LED 60, and has a concave lens portion 532L. The concave lens portion 532L has a cylindrical lens shape as a curved surface shape that is concave toward the LED 60 (in the +y direction) and extends in the z direction. The light distributing portion 53J has the convex lens portion 532J having a concave cylindrical lens shape to have a function of expanding the light from the LED 60 in the x direction.

The curved surface shape of the light distributing portion is not limited to a convex or concave spherical lens shape or a convex or concave cylindrical lens shape, but may be any other curved surface shape such as a convex or concave ellipsoidal surface or a convex or concave aspherical lens shape. The curved surface shape of the light incident portion is not limited to a convex or concave cylindrical lens shape, but may be any other curved surface shape.

As described above, according to the present modification, the light distributing portion 53D, 53E, 53F of the light guide 50D, 50E, 50F has the slit portion 531D, 531E, 531F. The slit portion 531D, 531E, 531F expands the light from the LED 60 and in turn enhances the effect of expanding the light. In particular, since the slit portion 531E, 531F has a convex shape or a concave shape on one side of the optical axis, the function of narrowing or expanding the light can be enhanced. A curved surface shape such as a lens shape may be formed on the light emitting portion 56 side or both sides of the slit portion on the optical axis.

The light incident portion 51G, 51H of the light guide 50G, 50H has a concave or convex cylindrical lens shape. Therefore, the light that has entered from the LED 60 can be expanded or narrowed and then guided to the reflecting portion 54 and the cutout portions 55.

The light distributing portion 53C of the light guide 50C has a convex cylindrical lens shape. The light distributing portion 531 of the light guide 50I has the convex lens portion 5321 having a convex spherical lens shape. The light distributing portion 53J of the light guide 50J has the concave lens portion 532J having a concave spherical lens shape. The light distributing portion 53K of the light guide 50K has the convex lens portion 532K having a convex cylindrical lens shape. The light distributing portion 53L of the light guide 50L has the concave lens portion 532L having a concave cylindrical lens shape. Therefore, the light from the LED 60 can be expanded or narrowed and then guided to the front surface side (the −y direction side).

The description in the above embodiment and modifications are examples of the light guide according to the present invention, and the present invention is not limited thereto. For example, at least two configurations of the above embodiment and modifications may be combined as appropriate.

In the configurations of the above-described embodiment and modifications, the illumination target is the USB insertion part 30 in the vehicle, and the light emitter 21 around the insertion part 30 emits light, but the configurations are not limited thereto. Light may be emitted from a portion around an illumination target for the vehicle such as an insertion port for a connector of any other standard and kind such as HDMI (registered trademark) (High-Definition Multimedia Interface) and earphones, an engine starter switch (button), and an insertion port for an engine starter key. The illumination target need not be for a vehicle, such as an insertion port for a USB connector for PC (Personal Computer), an insertion port for a plug for a commercial power supply, a key for a door, and an insertion port for a door key.

In the configurations of the above-described embodiment and modifications, an LED is used as the light source, but the configurations are not limited thereto. Any other light source may be used, such as an LD (LASER Diode) or EL (ElectroLuminescence) light source, an electric bulb, and a fluorescent tube.

Furthermore, the detailed configurations and the detailed operations of the connector box 1, 2 in the above embodiment and modifications can be appropriately changed without departing from the spirit of the present invention.

The entire disclosure of Japanese Patent Application No. 2019-042887 filed on Mar. 8, 2019 and No. 2019-042887 filed on Feb. 13, 2020 is incorporated herein by reference in its entirety.

What is claimed is:

1. A light guide that guides light emitted by a light source to a portion around an illumination target, the light guide comprising:
    a light incident portion that the light emitted by the light source enters;
    a light emitting portion that is provided around the illumination target and that emits the light that has entered; and
    a light distributing portion that has a curved surface shape and a slit portion, and that distributes the light that has entered from the light source across the slit portion directly toward the light emitting portion,
    wherein the light incident portion is arranged at a position facing a light emitting surface of the light source and has a width so as to cover at least the light emitting surface of the light source.

2. The light guide according to claim 1, further comprising:
    a reflecting portion that reflects light in a direction toward the light emitting portion; and
    a cylindrical light guiding portion that guides the light that has entered the light incident portion toward the reflecting portion,
    wherein the reflecting portion is formed along an axis of the light guiding portion and has a spiral shape.

3. The light guide according to claim 2, further comprising:
    a cutout portion that is provided in the reflecting portion and that reflects the light emitted by the light source along the axis toward the light emitting portion.

4. The light guide according to claim 1, wherein the light incident portion has a curved surface shape.

5. The light guide according to claim 1, wherein:
    the light source emits white light, and
    the light guide is made of a transparent material that is colored in a desired color.

6. A light emitting device, comprising:
    the light guide according to claim 1;
    the light source; and
    the illumination target.

* * * * *